United States Patent [19]

Robinson, Jr. et al.

[11] Patent Number: 4,477,801
[45] Date of Patent: Oct. 16, 1984

[54] SEED MONITOR APPARATUS HARNESS ADAPTER FOR A CONVERTIBLE PLANTER

[75] Inventors: Edward L. Robinson, Jr., Naperville; Augustyn M. Gesior, Clarendon Hills, both of Ill.

[73] Assignee: International Harvester Co., Chicago, Ill.

[21] Appl. No.: 358,070

[22] Filed: Mar. 15, 1982

[51] Int. Cl.³ .............................................. G08B 21/00
[52] U.S. Cl. ....................................... 340/684; 111/1; 339/29 R; 339/222
[58] Field of Search ............................ 340/684; 111/1; 339/29 R, 222

[56] References Cited

U.S. PATENT DOCUMENTS 3,762,603 10/1973 Bauman et al. ...................... 221/211
3,921,159 11/1975 Steffen ................................. 340/684
4,009,799 3/1977 Fathauer ................................. 221/6

Primary Examiner—Glen R. Swann, III
Attorney, Agent, or Firm—Dennis K. Sullivan; F. David Aubuchon

[57] ABSTRACT

A harness adapter is disposed between the seed monitor logic circuitry and the individual row unit seed detectors upon conversion of a planter for operation of only a portion of its planting units. The adapter provides a continuous series of connections from the detectors associated with operative row units while electrically isolating the detectors on the non-operative row units.

4 Claims, 6 Drawing Figures

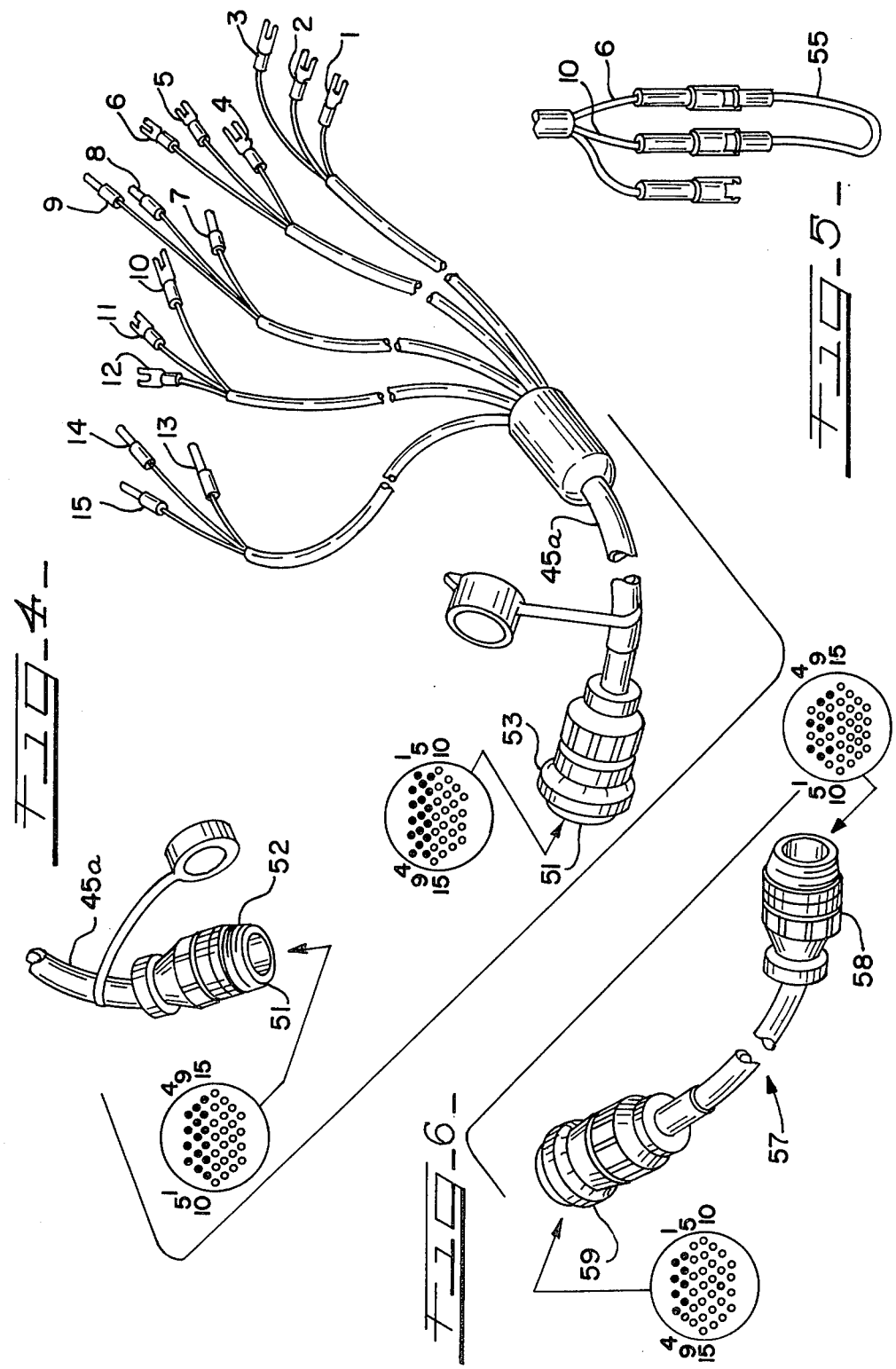

SEED MONITOR APPARATUS HARNESS ADAPTER FOR A CONVERTIBLE PLANTER

FIELD OF THE INVENTION

This invention pertains generally to a seed monitoring apparatus for a multi-row planter.

DESCRIPTION OF THE PRIOR ART

On multi-row planters which utilize separate row units which prepare the furrow, dispense the seed, either from an individual or central hopper, and close the furrow, it has been customary to provide an indication whether each row is being planted. Thus, the monitor generally provided a light to indicate any malfunction. Since many rows could be involved, using a separate indicator light for each row became unduly expensive.

As a consequence, a single display was provided for all of the rows. By suitable circuitry, any failure to plant seeds by a row dispenser would be detected and the particular row number displayed on the display. If more than two dispensers were defective, the display would provide an "F" indication. The operator would then be alerted and could correct the malfunctions.

The latter described monitor has been used with success for some time. A problem arises, however, when it is desired to provide a convertible planter—that is, a planter usable, for example, with corn and also soybeans. For corn a row spacing of 30 inches is frequently utilized. Soybeans, however, are planted in rows of 15 inches or less. The convertible planter can be achieved by positioning another row unit between the 30 inch spaced corn row units and then planting all the now 15 inch spaced rows in soybeans. With an air type planter this is not difficult as usually a centralized hopper is utilized along with a changeable, centralized drum selector having tubes for the seed connected to the row units. However, the monitor previously described cannot be used unless all of the electrical leads to the seed detectors located at each row unit are rearranged for each crop planted. This is difficult and takes an undue amount of time.

SUMMARY OF THE INVENTION

Applicants, as a consequence, have designed a special quick attachment adapter that converts the monitor from soybean operation to the corn operation without changing the balance of the monitor apparatus. Specifically, Applicants provide a special adapter that is insertable in the monitor harness that provides a connection to the seed detector circuit means found on each row unit, but that only connects the units that remain down under both conditions of planting—i.e. the 30 inch spaced corn units. The selector drum is removed when changing over the crop to corn and the manifolds to the disconnected units are plugged so seed will not move therethrough. Also, a band is placed on the exterior of the drum holes for the disconnected row units. The adapter connects the down units to the logic circuit in a continuous series of connectors, eight shown, so that no open circuits exist which will show no seed flow. Thus, the down units will provide an indication of the failure of seed dispensing by row. Should soybean planting be desired, the adapter is removed, the disconnected row units lowered, the drum (or drums) changed for soybeans and the bands and manifold plug removed. The monitor will now provide a display of all the down units now used to plant soybeans at the 15 inch intervals.

It is, therefore, an object of this invention to provide a new and improved seed monitor apparatus for a convertible planter.

Another object of this invention is to provide a quick attachable harness adapter for a seed monitor apparatus for use when the planter is converted to another crop.

BRIEF DESCRIPTION OF THE DRAWINGS

FIG. 4 is a view of a portion of the monitor harness for use with the planter of FIG. 1;

FIG. 5 is the modification of FIG. 4 necessary for its use; and

FIG. 6 is a view of a portion of the seed monitor harness adapter for use with the planter of FIG. 2.

DESCRIPTION OF THE PREFERRED EMBODIMENT

Figure 1:
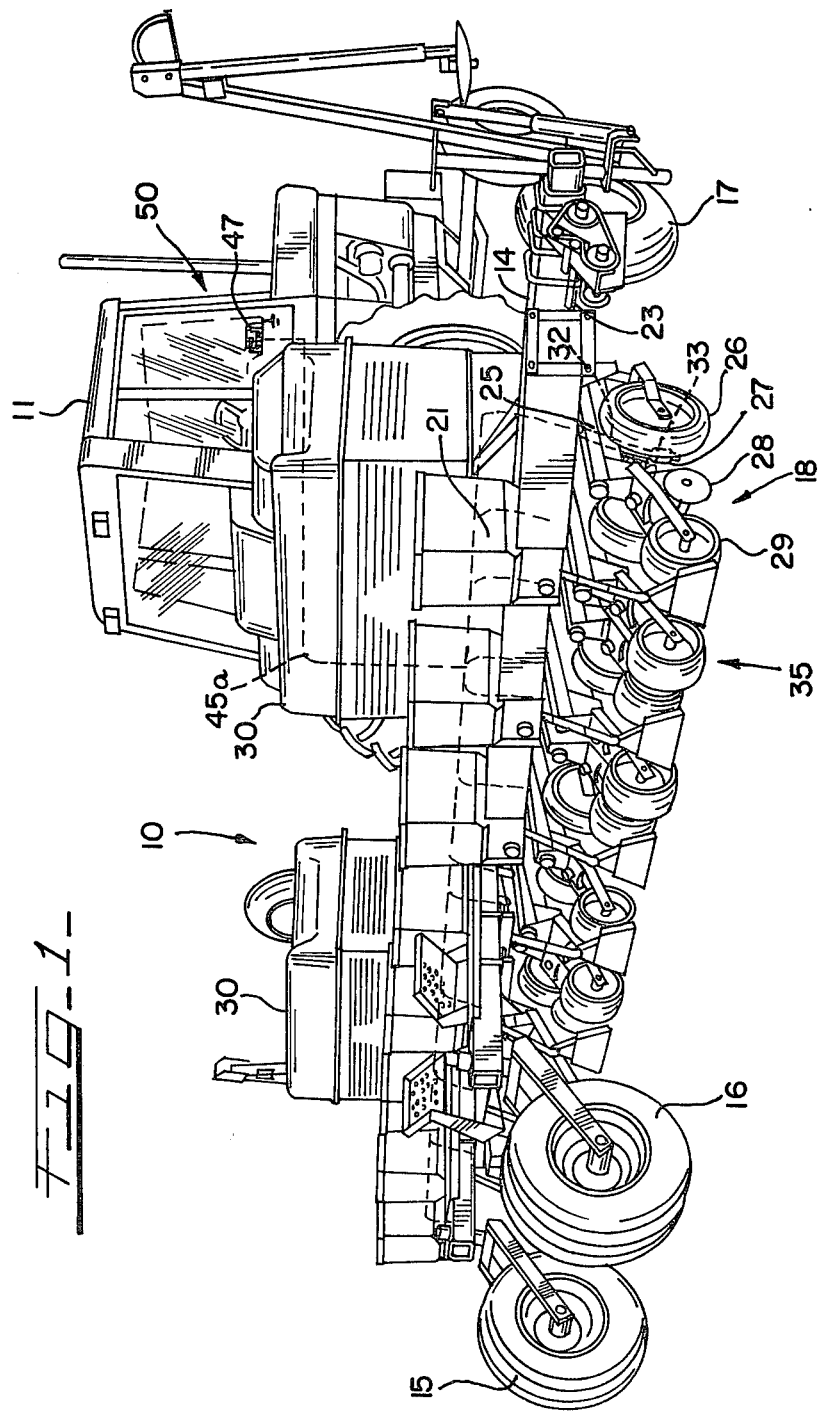
FIG. 1 is a rear, perspective view of a convertible planter with all of the row units in the planting position for one crop.
Figure 2:
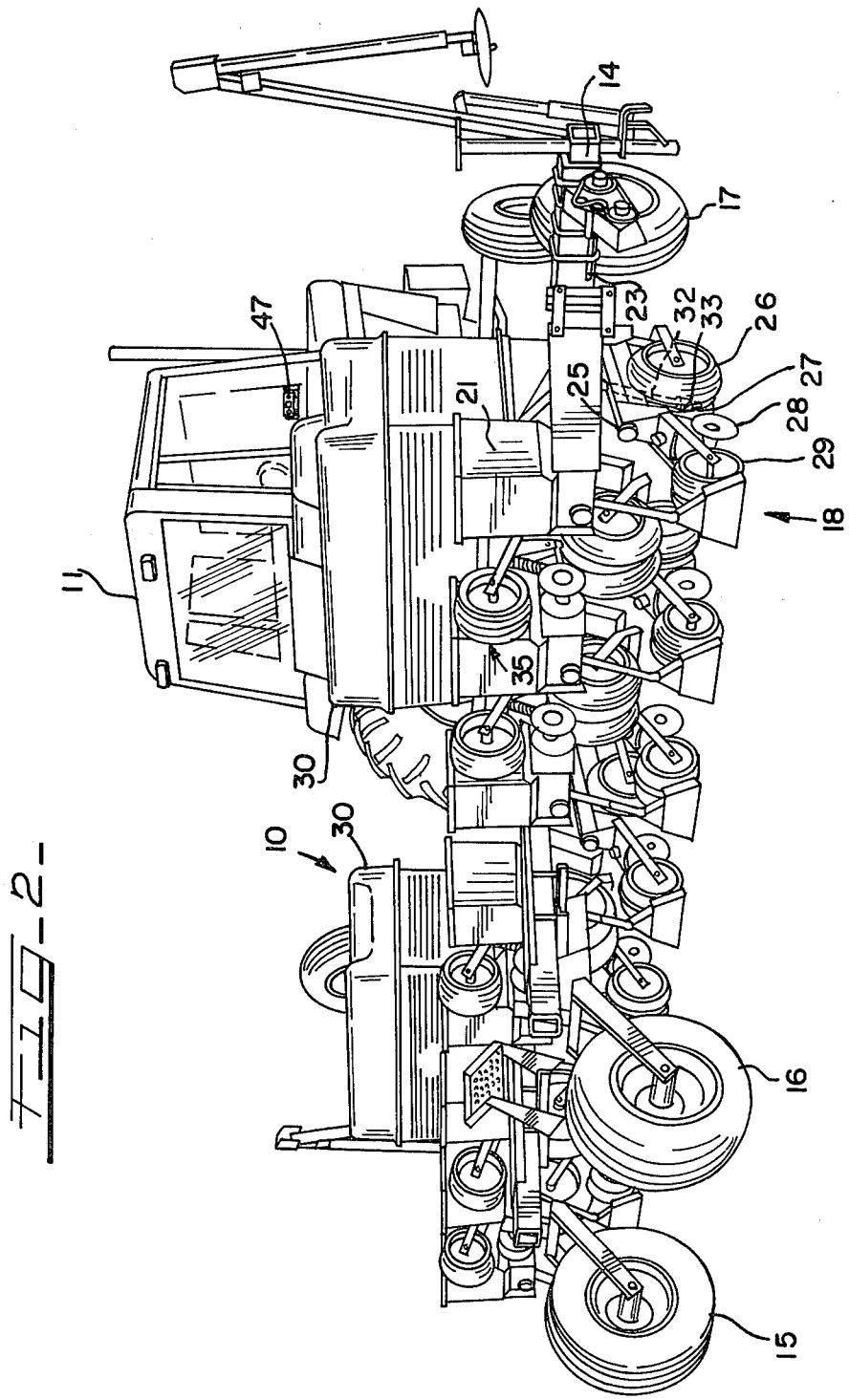
FIG. 2 is a rear, perspective view of the connectible planter of FIG. 1 with some of the row units disconnected and in the non-planting position for another crop.

Referring to FIGS. 1 and 2, 10 indicates a convertible planter semi-mounted on tractor 11. Planter 10 includes a transversely extending tool bar 14 and a pair of spaced, castering assist wheels 15 and 16 extending rearward of the tool bar to provide support for planter 10. Front ground wheels 17 (one shown) also provide support and drive the seed selector drum and other metering devices. As shown in FIG. 1, planter 10 is equipped for planting soybeans. Row units 18 are mounted on tool bar 14 at preferably 30 inch intervals by parallel bar linkages to allow each unit to follow the ground contour. Normally each unit 18 is utilized to plant corn and hence has a granular chemical hopper 21 (as shown) mounted on the unit, the dispenser of which is driven by shaft 23 extending along the tool bar. Each row unit 18 has a frame 25 (that supports the hopper 21) connected to the tool bar by the aforementioned type linkage, supporting gauge wheels 26, dual frame mounted opening disks 27, covering disks 28 and press wheel 29. Seed from central hoppers 30 is delivered to each unit 18 by seed tube or dispenser 32 mounted on frame 25 and exits past seed sensor 33 into the furrow created by disks 27. A drum seed selector rotatably mounted on the front of each hopper 30 and driven by wheels 17 selects the seed which is carried by air supplied by a hydraulically driven fan to the unit 18. For a full understanding of the selector and delivery system, reference may be had to U.S. Pat. No. 3,762,603 issued Oct. 2, 1973 to Jack L. Bauman for Seed Dispenser for Planters.

Also shown in FIG. 1 are row units 35. Each row unit 35 is also mounted to tool bar 14 by parallel bar linkages. Preferably, each unit 35 is spaced midway between adjacent row units 18 thereby producing soybean spacing of 15 inches for row units 18 and 35 across tool bar 14 except where rear assist wheels 15 and 16 are located. Thus, if desired that a row unit 35 be located in the position occupied by the assist wheels (and same is possible if the support structure for each wheel was raised) there would be 15 row units across the tool bar with the hopper-mounted units 18 being 1, 3, 5, 7, 9, 11, 13 and 15 (8 units in the first row) and units 35 being 2, 4, 6, 8, 10, 12 and 14 (7 units in the second row). As shown, assist wheels 15 and 16 occupy the space of units 6 and 10 for a total of 13 row units. Applicants prefer to leave empty spaces (tractor tire tracks) in lieu of rows 6 and 10 for the subsequent use of a cultivator for the soybean crop. Also to be noted is each row unit 35 is mounted rearward of the adjacent row unit 18 to create a second row and provide space for trash to move between the units 18 and 35 to prevent plugging.

Figure 3:
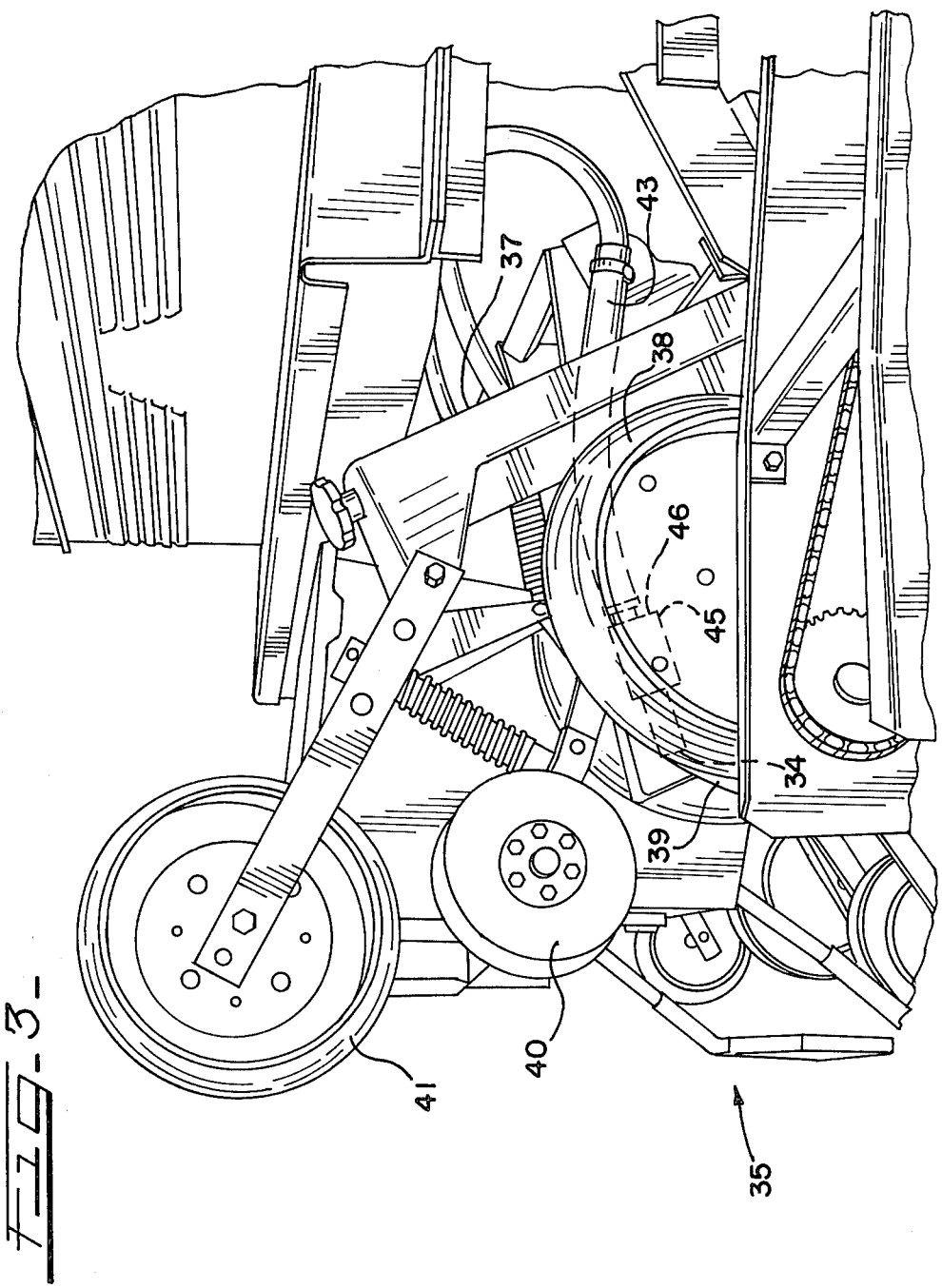
FIG. 3 is a view of a disconnected unit showing the seed detector.

FIG. 2 shows a convertible planter 10 when only corn is to be planted. In this postion the row units 35 are disconnected or locked up via any suitable mechanism in the non-planting position. Thus, rows 1, 3, 5, 7, 9, 11, 13 and 15 are spaced to plant corn at 30 inches. FIG. 3 shows the row unit 35 to a larger scale. Unit 35 is similar to unit 18 except for the lock up position and the lack of a granular chemical hopper. Unit 35 has frame 37, gauge wheels 38, opening disks 39, covering disks 40, press wheel 41 and seed tube or dispenser 43 along with seed sensor 45 and electrical lead 46. Although numbered differently for clarity, the elements of 35 correspond to those of 18 and the seed dispenser and seed sensors are identical.

Also shown in FIG. 1 is the single (row) display console 47 for the seed monitoring apparatus 50. Console 47 has a lead to a battery and an electrical connection to each sensor 33 and 45 via a harness 45a (see FIGS. 1 and 4) including a two-piece connector 51 (see FIG. 4) mounted on the planter 10. Portion 52 of connector 51 extends to the monitor display console 47 via logic circuits and 53 to the seed sensors 33 and 45. In the soybean planting position of FIG. 1, the 15 darkened electrical connections of portion 52 are directly connected to the comparable darkened connections of portion 53. Noted in FIG. 5 is the shorting wire 55 connecting leads 6 and 10 to prevent same from providing a signal. Rows 6 and 10 will thus not be shown on the display.

Also noted in FIGS. 4 and 5 that upon joining portion 52 and 53 for soybean planting is that all are in a continuous series and all darkened electrical connections are joined. There are no open circuits which would provide an indication of a non-seed flowing row. For a complete disclosure of a suitable electrical circuit for the monitor apparatus of the convertible planter 10, reference should be made to U.S. Pat. No. 4,009,799 issued Mar. 1, 1977 to George H. Fathauer and entitled Monitor For Seed Planting Apparatus. U.S. Pat. No. 4,009,799 is hereby incorporated in, and made a part of subject Application insofar as is consistent with the present disclosure. As noted in the patent, the absence of seed causes the faulty row to be noted on the display. If two or more rows are involved an "F" indication appears on the display.

When only corn is to be planted, row units 35 are raised as shown in FIG. 2. The drums must be changed for the larger seed. At that time the manifolds for the row units 35 are plugged and a band placed over the exterior holes for the rows on the drum. Regarding the monitor apparatus, as shown in FIG. 6, adapter 57 is utilized. Adapter 57 has only darkened contacts in part 58—1, 3, 5, 7, 9, 13 and 15 for the corn units of FIG. 2. Thus, only these rows will be monitored and only they will be connected to the monitor apparatus when part 58 is joined to portion 53. However, contacts 1, 3, 5, 7, 9, 13 and 15 must be connected to portion 52 in a continuous series of eight connections. Thus, 15 is connected to 8, 13 to 7, 11 to 6, 9 to 5, 7 to 4, 5 to 3, 3 to 2 and 1 to 1. Thus, only 8 connections in a continuous series are made between 59 and 52. Thus, there are no open circuits and the failure to complete a circuit on seed flow stoppage will be indicated with the proper row identified. The use of the adapter makes its insertion in the circuit easy and requires no other change in the monitor apparatus upon change in planting various crops.

In view of the above remarks it is felt that the operation of the design and advantages therefrom is readily apparent from the description detailed above.

What is claimed is:

1. In a multi-row planter having a plurality of seed dispenser equipped row units, a portion of said plurality of units being operatively disconnectable from said planter, a remaining portion of said row units being operative, a plurality of seed detecting circuit means respectively associated with the dispensers of the plurality of row units, readout display means, logic circuit means coupled between said plurality of seed detecting circuit means and said readout display means and responsive to output signals from said seed detecting circuit means for energizing said readout display means to identify which of said plurality of dispensers is operating improperly, wherein the improvement comprises: a quick attachable adapter, usable when said portion of said dispenser equipped row units are disconnected, that is insertable between said plurality of seed detecting circuit means and said logic circuit means and connecting the seed detecting circuit means associated with said remaining portion of said row units to said logic circuit means while isolating the seed detecting circuit means associated with the disconnected units, said adapter also connecting said logic circuit means in a continuous series of connections to provide a display for said remaining portion of said seed dispenser row units.

2. The planter of claim 1, in which said portion includes individual dispenser equipped row units that are generally spaced between adjacent dispenser equipped units of said remaining portion of units.

3. The planter of claim 2, in which said individual units of said portion are positioned rearwardly of said adjacent units of said remaining portion.

4. The planter of claim 3, in which said portion of said dispenser equipped units totals 5 and said remaining portion totals 8 for a plurality of dispenser equipped units of 13.

* * * * *